United States Patent [19]

Watanabe

[11] 4,430,743

[45] Feb. 7, 1984

[54] FAST START-UP SYSTEM FOR TRANSVERSAL EQUALIZERS

[75] Inventor: Kojiro Watanabe, Tokyo, Japan

[73] Assignee: Nippon Electric Co., Ltd., Tokyo, Japan

[21] Appl. No.: 321,101

[22] Filed: Nov. 13, 1981

[30] Foreign Application Priority Data

Nov. 17, 1980 [JP] Japan ............................. 55-161534
Dec. 10, 1980 [JP] Japan ............................. 55-174198

[51] Int. Cl.³ ............................................. H04B 3/18
[52] U.S. Cl. ...................................... 375/13; 375/15; 333/18
[58] Field of Search ................ 333/18; 364/724, 728, 364/819, 825, 827; 375/13, 14, 15

[56] References Cited

U.S. PATENT DOCUMENTS 3,715,666 2/1973 Mueller et al. ....................... 375/13
4,089,061 5/1978 Milewski ............................. 375/13
4,370,726 1/1983 Caracappa ......................... 364/728

*Primary Examiner*—Benedict V. Safourek
*Attorney, Agent, or Firm*—Blakely, Sokoloff, Taylor & Zafman

[57] ABSTRACT

A fast start-up system is disclosed for a transversal equalizer comprising a transmitter capable of generating a periodic symbol sequence with a period L, the auto correlation function of said sequence being 0, except for its center. The system generates and transmits a test signal based upon the generated symbol sequence. A receiver generates the same periodic symbol sequence as that generated in the transmitter in a proper phase relation thereto according to a received signal. The correlation between L sampled values and a sequence obtained by recirculating the periodic symbol sequence for each of consecutive M shifted phases, and for each of M' consecutive shifted phases is calculated. The calculated M+M' correlation values are multiplied by a constant. A discrete Fourier transform is obtained for the M+M' multiplied correlation values at N points equal to or greater than M+M' in number. The values of a predetermined frequency characteristic for frequency points obtained from the discrete Fourier transform are stored. The stored values are then divided by the respective values obtained by the discrete Fourier transform and the inverse discrete Fourier transform of the N divided values is obtained. The numerical values obtained as the inverse discrete Fourier transform are used to initialize the tap gain of a transversal automatic equalizer with a basic delay interval equal to one half the symbol interval, thereby permitting a sufficiently equalized state to be realized rapidly with a short test sequence.

2 Claims, 19 Drawing Figures

FIG. 7A SAMPLE CLOCK
FIG. 7B S/H OUT
FIG. 7C SR 11 CLOCK
FIG. 7D SR 11 CONTENTS
FIG. 7E SHIFT OUT
FIG. 7F SYMB. GEN. OUT
FIG. 7G
FIG. 7H ADDER 21 OUT
FIG. 7I SR 42 CLOCK
FIG. 7J SYMB. GEN. 44 CLOCK
FIG. 7K SYMB. GEN. 44 OUT
FIG. 7L SR 42 CONTENTS
FIG. 7M SR 42 CONTENTS AFTER LT

FAST START-UP SYSTEM FOR TRANSVERSAL EQUALIZERS

BACKGROUND OF THE INVENTION

This invention relates to automatic equalizers for compensating distorting data transmission channels and more particularly to rapid initial adjustment of such equalizers with respect to channel characteristics.

Intersymbol interference due to the overlapping of response components of consecutive signals is a serious impairment in synchronous digital data transmission over voiceband telephone channels. Some kind of automatic equalization is therefore necessary when transmitting high-speed data over such a channel with unknown characteristics. The equalizer generally consists of a transversal filter with adjustable tap coefficients.

If the response of the transmission channel to a single pulse and its noise characteristics are known to the receiver, the optimum tap gains can theoretically be calculated from a system of simultaneous equations. Automatic equalizers solve these equations by iterative algorithms, which lead to results of sufficient precision for practical use after a finite number of iterations. After initial adjustment, the receiver associated with the equalizer is ready for data reception.

In an increasing number of today's applications, high-speed data messages are transmitted in short bursts. Such applications occur in polling situations including airline reservation, inventory control and banking systems. Data set start-up time seriously limits the efficiency of such systems when it approaches or exceeds the actual message time.

The efficiency of a data transmission system relative to start-up time (neglecting roundtrip delays) may be defined as $$\epsilon = T_M/(T_M + T_S),$$

where $T_M$ and $T_S$ are respectively message time and start-up time. A typical polling message of 120-bit length can be transmitted in time $T_M = 12$ miliseconds at a 9,600-bit-per-second rate. However, a representative data set (not arranged for fast start up) capable of this transmission rate needs the time $T_S = 250$ miliseconds to start up. High-speed data sets themselves often require longer absolute start-up times because more sophisticated carrier and timing control as well as equalizer control are required. In this example 95 percents of the connection time for the message is needed for start up, while only 5 percents is used for actual information transfer.

In U.S. Pat. No. 3,715,666, an equalizer is proposed in which the start-up time is shortened. However, in the proposed equalizer great reduction of the start-up time cannot be obtained since the tap coefficients are sequentially determined.

SUMMARY OF THE INVENTION

An object of the invention is to provide a fast start-up system for transversal equalizers which can overcome the above drawbacks and shorten the start-up time.

To accomplish the above object, according to the invention, there is provided a fast start-up system for a transversal equalizer comprising means provided in a transmitter for generating a periodic symbol sequence with a period L, the auto correlation function of said sequence being completely 0 except for its center; means for generating and transmitting a test signal based upon said generated symbol sequence; means provided in a receiver for generating the same symbol sequence as that generated in the transmitter in a proper phase relation thereto according to a received signal; means for calculating the correlation between L sampled values obtained by sampling the received test signal at the symbol interval and a sequence obtained by recirculating said periodic symbol sequence for each of consecutive M shifted phases; means for calculating the correlation between L sampled values obtained by sampling the received test signal at the symbol interval with a phase differring from the phase of said first-mentioned sampled values by an amount corresponding to one half of the symbol interval and a sequence obtained by recirculating said periodic symbol sequence for each of M' consecutive shifted phases; means for multiplying said calculated M+M' correlation values by a constant; means for obtaining discrete Fourier transform of the M+M' multiplied correlation values at N points equal to or greater than M+M' in number, means for storing values of a predetermined frequency characteristic for frequency points obtained as the discrete Fourier transform; means for dividing the stored values by said respective values obtained by the discrete Fourier transform; means for obtaining inverse discrete Fourier transform of the N divided values; and means for initializing, with the numerical values obtained as the inverse discrete Fourier transform, the tap gain of a transversal automatic equalizer with the basic delay interval equal to one half the symbol interval, thereby permitting a sufficiently equalized state to be released fast with a short test sequence.

BRIEF DESCRIPTION OF THE DRAWINGS

The above and other objects of the invention will be more fully understood from the following detailed description having reference to the accompanying drawings in which:

FIGS. 7A to 7M are waveform diagrams for explaining the operation of the embodiment of the invention.

In FIGS. 1 to 6, thin lines represent time-serial binary or analog signal lines and thick lines represent parallel binary signal lines.

DESCRIPTION OF THE PREFERRED EMBODIMENT

Figure 1:
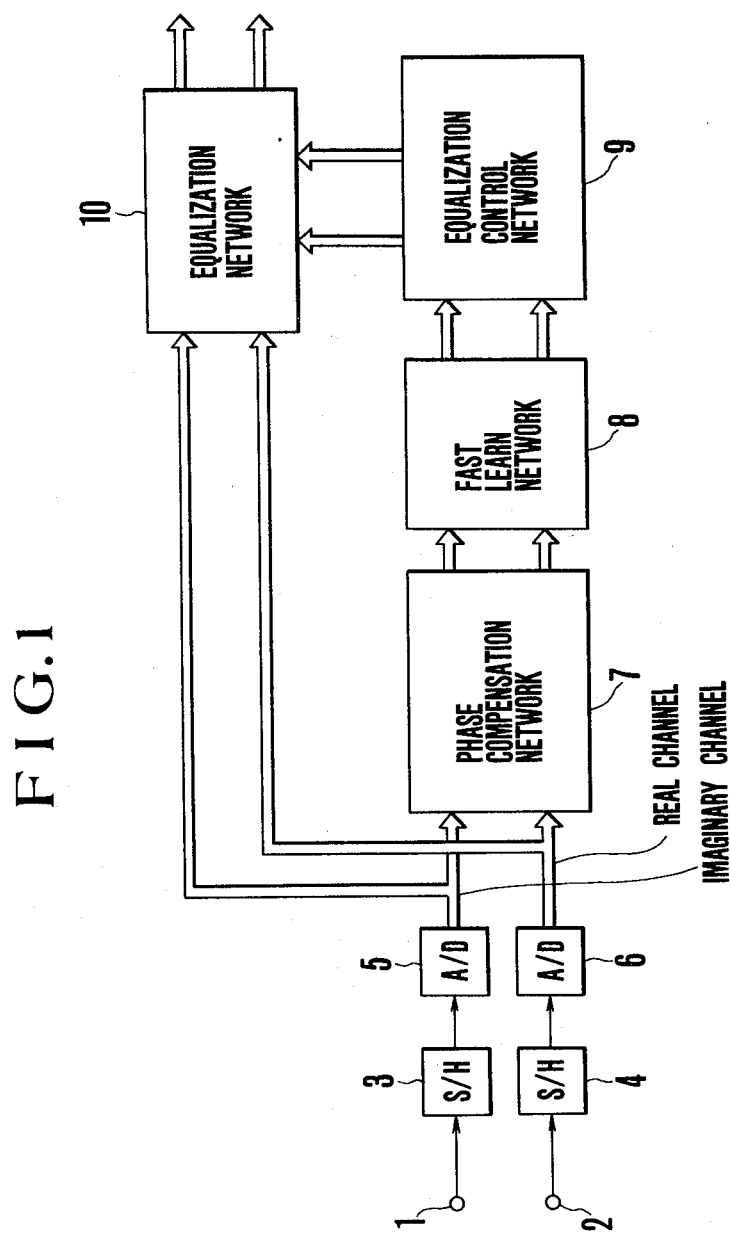
FIG. 1 is a block diagram showing an embodiment of the invention.

The principle underlying the invention will first be described.

The construction according to the invention comprises a first section for removing phase disturbances caused by the transmission channel, such as frequency offsets and carrier phase jitters, from the input signal, a second section for estimating the impulse response of the transmission channel from the input signal removed of the transmission channel phase disturbances, and a third section for controlling the tap coefficients of a transversal filter constituting an equalizer according to the estimated impulse response.

In the first place, the first section for removing the transmission channel phase disturbances according to the invention will be described.

In accordance with the invention, instead of isolated impulses, a periodic symbol sequence $a_0, a_1, \ldots, a_{L-1}, a_0, a_1, \ldots$ with a period L equal to or longer than the ratio between the significant duration of impulse response and the symbol interval is transmitted. In this case, a received signal S(t) added with noise n(t) and subjected to phase variation $\phi(t)$ appears at the output of a system (equivalent baseband) of impulse response h(t).

$$\gamma(t) = \sum_{k=0}^{\infty} a_{<k>} h(t - kT) + n(t) \tag{1}$$

$$S(t) = \gamma(t) \exp\{j\phi(t)\} \tag{2}$$

where $<k> = k$ modulo L.

The phase variation term in equation (2) can be removed under the following conditions as will be described below:

(1) the impulse response h(t) starts at t=0 and has a peak in the neighborhood of t=pT,
(2) the significant duration of h(t) is LT or less, and
(3) the autocorrelation of the periodic symbol sequence within one period is an impulse.

Neglecting noise, the conditions (1) and (2) above provide a sampled value series $S_0, S_1, \ldots$ obtained by sampling S(t) for every period T from $t=t_0$, which is:

$$S_i = \sum_{k=0}^{L-1} a_{<i-k>} h_k \exp(j\phi_i) \tag{3}$$

where $h_k$ and $\phi_i$ are abbreviations of $h(t_0+kT)$ and $\phi(t_0+iT)$, respectively.

Meanwhile, in consideration of $a^*_{<i-p>}$ which is in complex conjugate relation to $a_{<i-p>}$, the correlation $\rho_i$ between $S_i$ and $a^*_{<i-p>}$ within one period is calculated as, $$\rho_i = \sum_{l=0}^{L-1} a^*_{<i+l-p>} S_{i+l} \tag{4}$$

$$= \sum_{l=0}^{L-1} a^*_{<i+l-p>} \sum_{k=0}^{L-1} a_{<i+l-k>} h_k \exp(j\phi_{i+l})$$

$$= \sum_{k=0}^{L-1} h_k \sum_{l=0}^{L-1} a_{<i+l-k>} a^*_{<i+l-p>} \exp(j\phi_{i+l})$$

The condition (3) mentioned above signifies $$(1/L) \times \sum_{l=0}^{L-1} a_{<l>} a^*_{<l-m>} = \delta_{m0}$$

where $\delta_{m0}$ is 1 only when m is 0 and is 0 when m is other than 0. Considering this condition and assuming that $\phi_{i+l}$ is a constant value $\overline{\phi_i}$ while l is changing from 0 to L−1, equation (4) can be rewritten as, $$\rho_i = L h_p \exp(j\overline{\phi_i}) \tag{5}$$

indicating that the phase variation term can be extracted. Actually, $\phi_i$ is not constant, but if the phase variation rate is sufficiently low compared to 1/LT, $\rho_i$ in equation (5) can be used as information on the phase variation at time $t=t_0+iT$. To make $S_i$ approach $\gamma_i$ which is removed of disturbance using this information, phase rotation is effected in the reverse direction by an amount corresponding to the extracted phase variation term. Thus, an approximation $\gamma_i$ can be obtained as a result of the phase rotation:

$$\gamma_i = S_i \exp(-j \arg \rho_i) \tag{6}$$

where $j = \sqrt{-1}$ and $\arg \rho_i$ represents the phase term of $\rho_i$ in equation (5) which contains a phase term of $h_p$ in addition to the true phase variation term. Hence the approximation $\gamma_i$ contains the phase term $h_p$ as well. However, the phase term $h_p$ is constant and does not constitute any obstruction to the adjustment of an automatic equalizer.

The series satisfying the condition (3) mentioned above is exemplified for L=15 as below.

$$\alpha\alpha\alpha\beta\alpha\alpha\beta\beta\alpha\beta\alpha\beta\beta\beta\beta$$

$$\text{where } \alpha = \left(-1 + \frac{1 \pm \sqrt{L+1}}{L}\right) / \sqrt{\left(1 + \frac{1}{L}\right)} \tag{7}$$

$$\text{and, } \beta = \left(1 + \frac{1 \pm \sqrt{L+1}}{L}\right) / \sqrt{\left(1 + \frac{1}{L}\right)}$$

This series is equivalent to what is obtained by respectively assigning 0 and 1 in maximum length sequence (M sequence) with a period of 15, namely,

000100110010111 to $\alpha$ and $\beta$. That is, the condition (3) can be met by assigning the afore-mentioned values of $\alpha$ and $\beta$ to all the other M sequences and quadratic residue sequences.

Now, the second section according to the invention, i.e., means for estimating the impulse response from sampled values free from phase variation, will be described. Using a vector R, which denotes L sampled values corresponding to received sampled values removed of phase variation as given by equation (6) within $t = LT + t_0$ to $(2L-1)T + t_0$, the vector R represents L measured values containing information about the impulse response sampled values. As means for estimating M ($\leq$L) impulse response sampled values from the measured values, a least square method is well known. According to this method, since R can be expressed, from equation (1), as $$R = AH + N \tag{8}$$

$$R = \begin{pmatrix} \gamma_L \\ \gamma_{L+1} \\ \cdot \\ \cdot \\ \gamma_{2L-1} \end{pmatrix}, H = \begin{pmatrix} h_L \\ h_{L-1} \\ \cdot \\ \cdot \\ h_{L-(M-1)} \end{pmatrix}, N = \begin{pmatrix} n_L \\ n_{L+1} \\ \cdot \\ \cdot \\ n_{2L-1} \end{pmatrix} \tag{9}$$

where

-continued $$A = \begin{pmatrix} \begin{pmatrix} a_0, & a_1, \ldots, a_{M-1} \\ a_1, & a_2, \ldots, a_{<M>} \\ a_2, & a_3, \ldots, a_{<M+1>} \\ \vdots & \vdots \\ a_{L-1}, & a_0, \ldots, a_{<M+L-2>} \end{pmatrix} \underbrace{\phantom{aaaaaaaaaaa}}_{M} \end{pmatrix} L$$

MT: significant duration of impulse response (MT≦LT) and $<M>=M$ modulo L. Thus, the estimated value $\hat{H}$ of H is given as $$\hat{H} = [A^*A]^{-1}A^*R \quad (10)$$

where * indicates conjugate transposed matrix.

In the sequence of equation (7), [A*A] is L times the unit matrix. Hence, $$\hat{H} = 1/L \ A^*R \quad (11)$$

The estimation of the impulse response on the basis of equation (10) can thus be done very simply by generating a periodic symbol sequence on the receiving side and taking the inner product of its recirculated sequence and L received sampled values. If the phase of the symbol sequence generated on the receiving side is deviated, however, it is necessary to generate a symbol sequence at a proper phase or return the estimated response to the proper position through the detection of the amount of the recirculated shift, because the estimated impulse response is obtained through the recirculation.

While the description so far has assumed that the number of measurement values is L, i.e., the value of one period of the symbol sequence, estimation under a similar principle may be obtained by setting the number to an integral multiple of L. In this case, the precision of estimation can be improved by extending the training period.

Now, the principle of the third section according to the invention, i.e., means for setting the optimum value of the tap gain of the transversal automatic equalizer without being affected by the sampling phase. If the estimated impulse response $\hat{H}=(h_L, h_{L-1}, \ldots, h_{L-(m-1)})$ is accurate, through its Fourier transform, the frequency characteristic which is reflexed in Nyquist band is obtained as $$F[H] = \sum_{k=-\infty}^{\infty} H\left(\omega + \frac{2k\pi}{T}\right) e^{j(\omega + \frac{2k\pi}{T})\tau} \quad (12)$$

where $-(\pi/T) \leq \omega \leq (\pi/T)$, $\tau$ is a sampling phase or $t_0/T$ and $H(\omega)$ is the frequency characteristic of the transmission channel. The purpose of the equalizer is to provide, $$\sum_{k=-\infty}^{\infty} H\left(\omega + \frac{2k\pi}{T}\right) e^{j(\omega + \frac{2k\pi}{T})\tau} \cdot E\left(\omega + \frac{2k\pi}{T}\right) = 1 \quad (13)$$

where $-(\pi/T) \leq \omega \leq (\pi/T)$ and $E(\omega)$ is the characteristic of the equalizer. When the tap interval of the transversal automatic equalizer is T, $$E\left(\omega + \frac{2k\pi}{T}\right) = E(\omega) \ (K = -\infty \ \text{to} \ +\infty) \quad (14)$$

stands. From equations (12) and (13), $$E(\omega) = F[\hat{H}]^{-1} \quad (15)$$

is obtained.

According to this method, however, a situation prone to impossibility of equalization occurs if zero or nearly zero values occur in the bandwidth of F[Ĥ] in equation (12) depending upon the value of $\tau$. The invention aims to provide means for setting the initial value of the transversal automatic equalizer tap gain by avoiding such a situation. According to the invention, the estimation of equation (11) is done for $\hat{H}$ and $\hat{H}'$ which is out of phase relative to $\hat{H}$ by T/2, and a vector $\hat{H}_{T/2}$ is obtained by interleaving the individual elements. When deriving $\hat{H}'$, however, the vector R' used instead of R in equation (11) includes as a component the element given as $$\gamma_{i+1/2} = S_{i+1/2} \exp(-j\arg\rho_i)$$

according to equation (6). In other words, the estimation of the phase variation is made for every T seconds, and the estimated value is used even after the lapse of T/2.

When $\hat{H}_{T/2}$ given as, $$\hat{H}(T/2) = (h_L, h_{L-1/2}, h_{L-1}, h_{L-3/2} \ldots, h_{L-(M-1)}, h_{L-(M-1/2)}) \quad (16)$$

is correct, through its N-point discrete Fourier transformer, $$F[\hat{H}_{T/2}] = \sum_{k=-\infty}^{\infty} H\left(\omega_i + \frac{4k\pi}{T}\right) e^{j(\omega_i + \frac{4k\pi}{T})\tau} \quad (17)$$

is obtained, where $$\omega_i = \frac{4\pi i}{NT} - \frac{2\pi}{T}$$

and $i=0$ to $N-1$. When it is further assumed that the bandwidth B of $H(\omega)$ is normally $1/T < W \leq 2/T$, $$F[H_{T/2}] = H(\omega_i) e^{j\omega_i \tau} \quad (18)$$

stands. In order for conditions of equation (3) to be satisfied on the discrete points with respect to the characteristic of the equation (18), $E(\omega_i)$ may be such that there holds an equation $$H(\omega_i) e^{j\omega_i} \cdot E(\omega_i) = Nq(\omega_i) \quad (19)$$

where $Nq(\omega_i)$ is the Nyquist characteristic. In this case, the tap interval of the transversal equalizer should be shorter than 1/B, for instance, T/2. The transversal automatic equalizer tap gain meeting such a condition is, from equation (13), given as a discrete inverse Fourier transform of $E(\omega_i) = Nq(\omega_i)/F[H_{T/2}]$. Since $Nq(\omega_i)$ is a predetermined characteristic for the system (for instance a 50% roll-off characteristic), it is known on the receiving side.

Thus, the optimization of the tap gain can be obtained through the inverse Fourier transform of N values resulting from dividing $Nq(\omega_i)$ by the i-th value of the estimated transmission channel characteristic.

Referring to FIG. 1, a real and an imaginary part of a demodulated signal obtained as a result of product demodulation of a quadrature amplitude modulated signal in a demodulator circuit, not shown, are applied to terminals 1 and 2, respectively. The real and imaginary parts of the signal are sampled by sample/hold circuits 3 and 4, respectively. The sampled signals are converted through respective analog-to-digital (A/D) converters 5 and 6 into corresponding digital signals.

The fast start-up system according to the invention comprises a phase compensation network 7 for removing from the digital signals the phase disturbance such as frequency offsets and carrier phase jitters introduced into the digital signals in the transmission line, a fast learn network 8 for estimating the impulse response of the transmission line from the digital signals removed of the phase disturbances, and an equalization control network 9 for controlling the tap coefficient of a transversal filter constituting an equalizer 10 according to the estimated impulse response.

The phase compensation network 7 materializing the first section in the principle underlying the invention will be described with reference to FIGS. 2 and 7A to 7H. In the description below, processing of the real part of signal is discussed, and it is to be understood that a similar processing is made for the imaginary part of signal. The outputs of the A/D converters 5 and 6 shown in FIG. 1 are fed to a peak detector 13 which will be described later in detail. When the peak detector 13 detects the peak with $\pm T/2$ accuracy in the impulse response carrying the first symbol $a_0$ appearing at the outputs of the A/D converters 5 and 6, it generates a trigger pulse. The output (FIG. 7B) of the A/D converter 5 is shifted into an L-stage shift register 11 under the control of a symbol rate frame pulse and L pulses (FIG. 7C) within a frame pulse (in-frame pulse) generated by a pulse generator 16. The output pulse of the A/D converter 5 appears for every T/2 period (FIG. 7A). However, since the shift-in cycle period is T, one of every two sampled values is input to the shift register 11. That is, the sampled value sequence $S_i, S_{i+1}, \ldots$ or $S_{i+1/2}, S_{i+3/2}, \ldots$ (FIG. 7D) in the equation (3) constitutes the contents of the shift register 11. The contents of the shift register 11 are shifted out and also recirculated under the control of L in-frame pulses generated from the pulse generator 16. The pulse output of the pulse generator 16 is also directed to a symbol generator 14 (to be described later in detail), and symbols (FIG. 7F) for one period are sequentially generated according to L in-frame pulses. Each shift-out output (FIG. 7E) of the shift register 11 and each generated symbol are multiplied by a multiplier 12, and the results are accumulated (FIG. 7G) in an accumulator 15 which is cleared by the frame pulse at the symbol rate. The symbol generator 14 is initialized such that it generates the sequence $a_0, a_1, \ldots$ when a trigger pulse generated from the peak generator 13 is supplied in the neighborhood of $t=PT$. Thus, after the appearance of the trigger pulse, the result of accumulation is $\rho_i$ in the equation (4). The result of accumulation is coupled at the symbol rate to a phase detector 17 in a phase detector section 170. In the phase detector section 170, the phase angle of $\rho_i$ is calculated in the circuit 17 from the real and imaginary parts of the accumulation result, and the result of calculation is fed to a ROM 18 to generate complex numbers each consisting of a cosine real part and a minus sine imaginary part, i.e., $\exp(-j \arg \rho_i)$ at the symbol rate. During the symbol rate, the value of $\exp(-j \arg \rho_i)$ is held. The output of the phase detector 170 is multiplied in multipliers 19 and 20 by the outputs of the A/D converters 5 and 6 for every period T/2. The outputs of the multipliers 19 and 20 are added together in an adder 21. The output of the adder 21 for every period T/2 corresponds to $\gamma_i = S_i \exp(-j \arg \rho_i)$ and $\gamma_{i+1/2} = S_{i+1/2}(-j \arg \rho_i)$. The output of the adder is held for the period T/2.

The network 8 for estimating the impulse response, which corresponds to the second section in the principle underlying the invention, will now be described with reference to FIGS. 3 and 7I to 7M. The output of the adder 21 (FIG. 2) is multiplied in a multiplier 40 by a symbol generated from a symbol generator 44. The symbol generator 44 is driven by a frame pulse synchronized to the frame pulse from the pulse generator 16 (FIG. 2) and 2L in-frame pulses (FIG. 7J) generated from a pulse generator 45 and multiplies one output (in the period T/2) of the adder 21 by L symbols (FIG. 7K). The output of the multiplier 40 is added in an adder 41 to the output of an 2L-stage shift register 42, which shifts out under the control of L pulses (FIG. 7I) generated from the pulse generator 45 during the period T/2. The output of the adder 41 is shifted into a shift register 42. During the period T/2 during which the output of the adder 21 is $\gamma_i$, the L shift register contents $C_0$ to $C_{L-1}$ are renewed to $C=C_0+\gamma_i a_0$, $C_1=C_1+\gamma_i a_1, \ldots, C_{L-1}=C_{L-1}+\gamma_i a_{L-1}$ (FIG. 7L). During the period T/2 during which the output of the adder 21 is $\gamma_{i+1/2}$, renewal to $C_L=C_L+\gamma_i 1/2 a_0$, $C_{L+1}+\gamma_{i+1/2} a_1, \ldots, C_{2L-1}=C_{2L-L}+\gamma_{i+1/2} a_{L-1}$ is made.

When $\gamma_{i+1}$ appears at the output of the adder 21, the phase of symbol generated by the symbol generator 44 is advanced by one by a frame pulse generated from the pulse generator 45. Thus, the shift register contents are renewed to $C_0=C_0+\gamma_{i+1} a_1$, $C_1=C_1+\gamma_{i+1} a_2, \ldots, C_{L-1}=C_{L-1}+\gamma_{i+1} a_0$ and also to $C_L=C_L+\gamma_{i+3/2} a_1$, $C_{L+1}=C_{L+1}+\gamma_{i+3/2} a_2, \ldots, C_{2L-1}=C_{2L-1}+\gamma_{i+3/2} a_0$.

The contents of the shift register 42 are held cleared while a timer 46 is providing a reset pulse output. The timer 46 continues to provide the reset pulse until a predetermined period of time has elapsed from the appearance of the trigger signal from the aforementioned peak detector 13 (FIG. 2), and after the lapse of a period LT from the deactivation of delivery of the reset pulse, it transmits a signal to the pulse generator 45 to stop the generation of pulses. When the timer 46 discontinues the provision of the reset pulse, the initial state of the symbol generator 44 is set to a predetermined value. During the period LT after the discontinuance of the reset pulse generation by the timer 46, 2 L accumulators each constituted by the adder 41 and shift register 42 calculate $\hat{H}$ in the equation (11) and $\hat{H}'$ which is out of phase relative to $\hat{H}$ by T/2. When the generation of shift pulses from the pulse generator 45 is stopped, the contents of the shift register 42 are L times $h_L, h_{L-1}, \ldots, h_{L-(M-1)}, h_{L-1/2}, h_{L-3/2}, \ldots, h_{L-(M-1)-1/2}$ (FIG. 7M). An attenuator 43 multiplies the contents of the shift register 42 by a value corresponding to 1/L.

Figure 4:
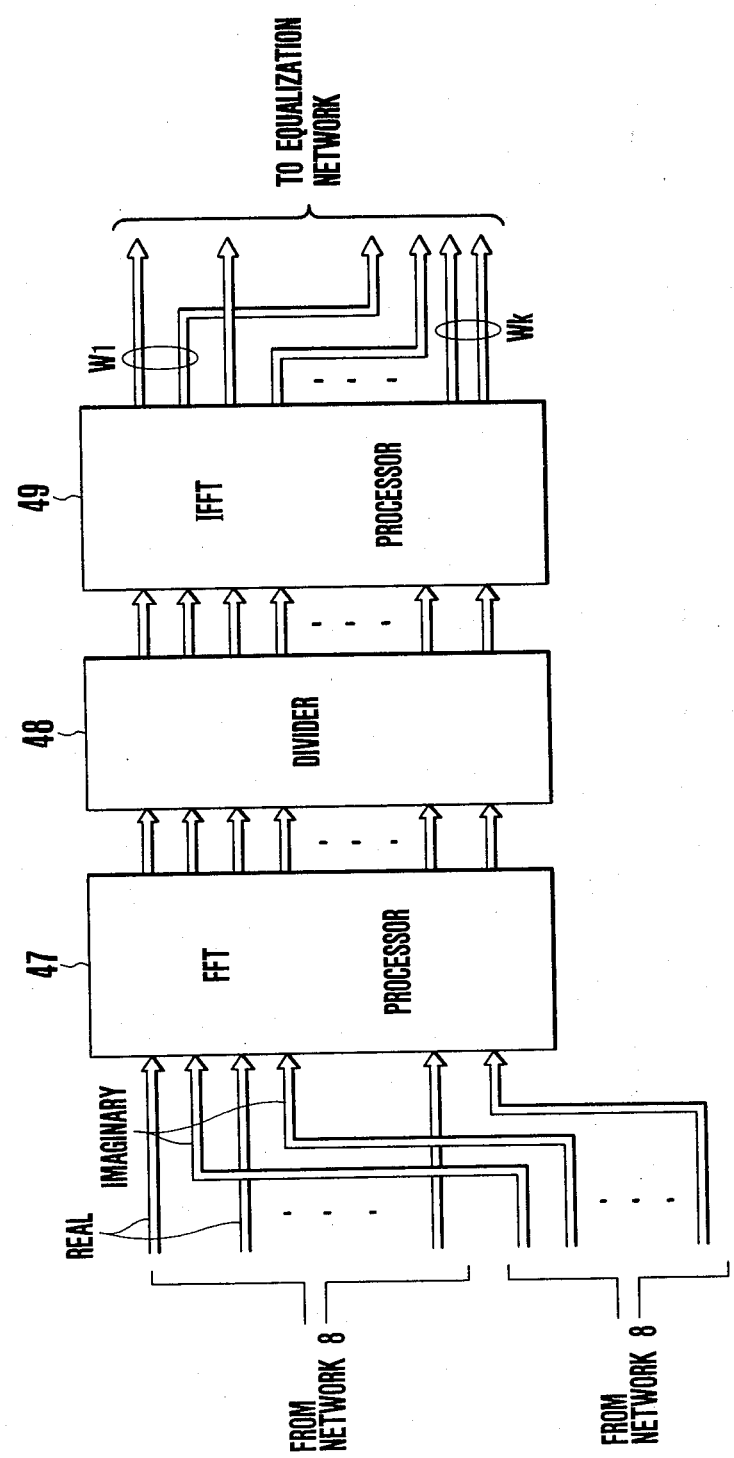

Now, the equalization control or tap coefficient control network 9 realizing the third portion of the principle underlying the invention will be described with reference to FIG. 4. The output of the attenuator (FIG.

3) is fed in the form expressed by the equation (16) to a memory section of a high rate Fourier transform processor 47. The processor 47 provides Fourier transform for N points, N being a power of 2 greater than 2L, and inserts 0 for N−2L points. The output of the processor 47 gives an estimation of the transmission line characteristic, i.e., at the Fourier transform of the impulse response, i.e., at a frequency obtained by uniformly dividing by N the frequency interval between $f=-1/T$ and $f=1/T$. A divider 48 divides N Nyquist characteristic values stored in memory by the corresponding processor outputs. The result of division corresponds to the frequency characteristic that is to be realized by the equalizer.

The result of division is returned by a high speed inverse Fourier converter 49 to a time region. The numerical value returned to the time region is directly supplied as the optimum complex values $W_1, \ldots, W_k$, where k is the number of taps, of tap gain of the transversal automatic equalizer 10 which is constituted by a delay line tapped at an interval of T/2.

It will be appreciated that with the system according to the invention the impulse response of the transmission channel is estimated in the network 8 from the test signal free from phase variations that is provided from the phase compensation network 7, and the equalization control network 9 determines the optimum value of the filter coefficient of the equalization network 10 according to the estimated impulse response.

Figure 2:
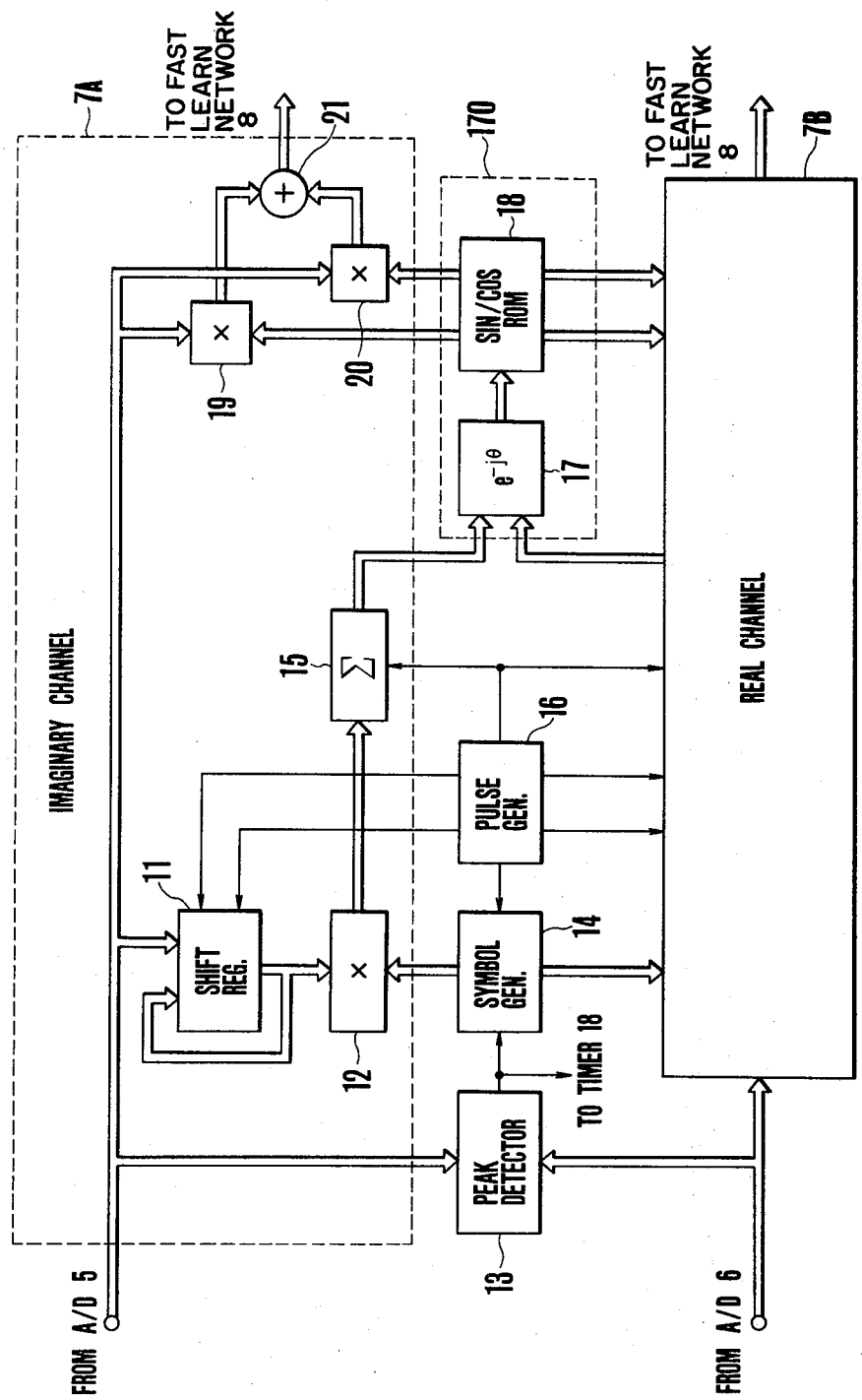
FIGS. 2 to 6 are block diagrams showing essential portions of the embodiment of FIG. 1.
Figure 3:
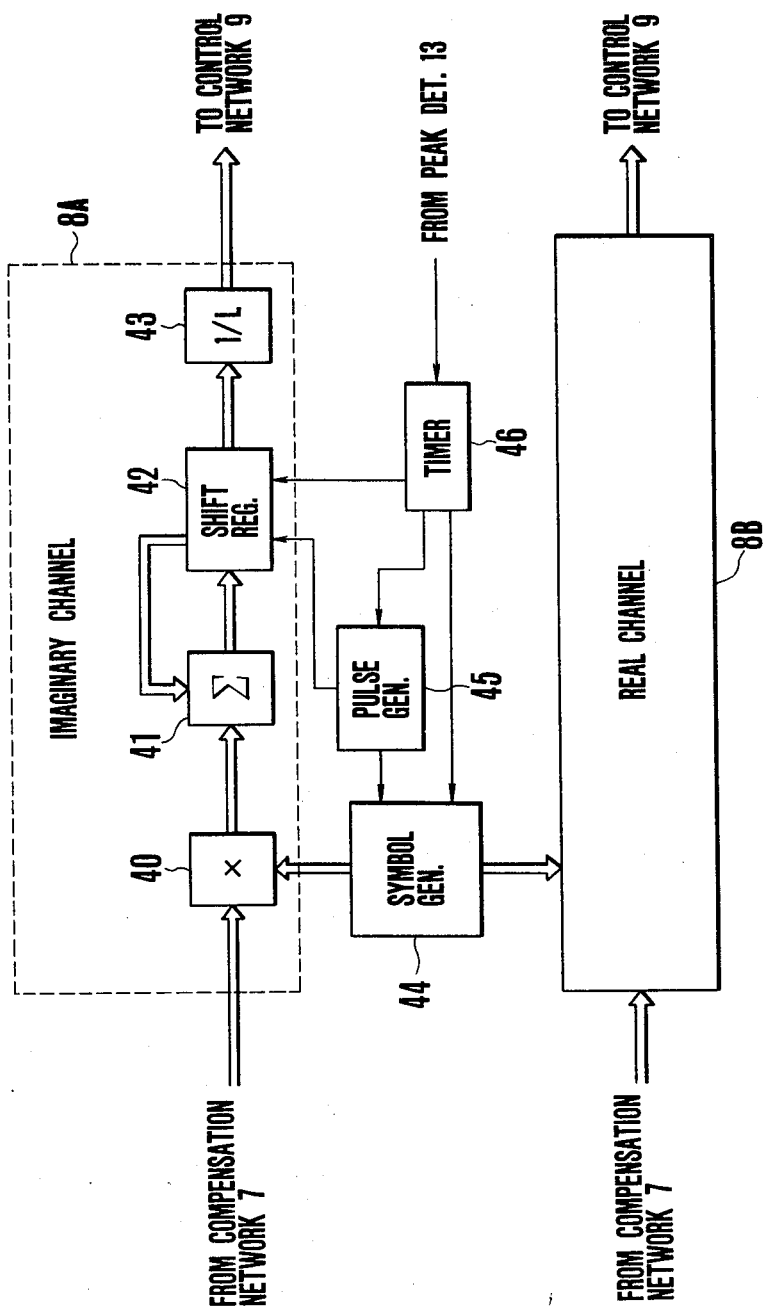
Figure 5:
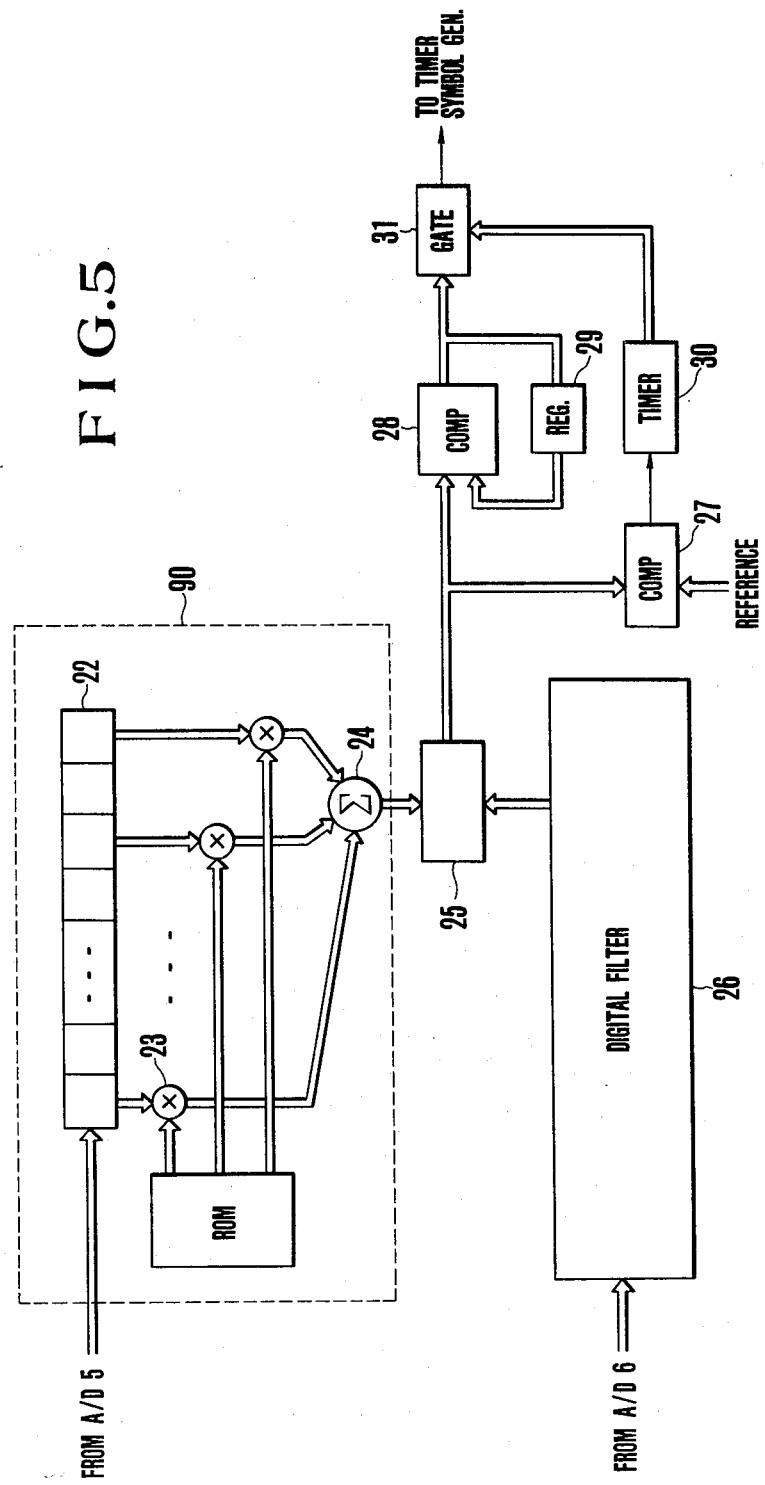

FIg. 5 shows a block diagram showing an example of the peak detector 13 shown in FIG. 2. The outputs of the A/D converters 5 and 6 (FIG. 2) are fed to a transversal filter 90, which includes a (2L−1)-stage shift register 22 for shifting in for every period T/2 and means for weighting the odd number order outputs of the shift register by a symbol sequence $a_0$ to $a_{L-1}$. The output of the transversal filter 90 is noise before the arrival of the first test signal energy at the receiving terminal and, after the arrival of the test signal, assumes sequential impulse response precursors $h_0, h_{1/2}, h_1, \ldots, h_p$ inclusive of phase rotation. The output of the transversal filter 90 is fed to an absolute value calculator 25, which calculates the sum of the squares of the real and imaginary parts and provides the square of the absolute value thereof. This value is compared to a comparator 28 with a value stored in a register 29. If the compared output of the absolute value calculator 29 is greater, the contents of the register 28 are renewed with that value. If the output of the absolute value calculator 25 is less, a trigger pulse is gated through a gate 31 to the outside. The gate 31 is driven by the output of a comparator 27, which generates a trigger signal when the output of the absolute value calculator 25 exceeds a threshold higher than the noise level, and is held open for a definite period (for instance LT).

Figure 6:
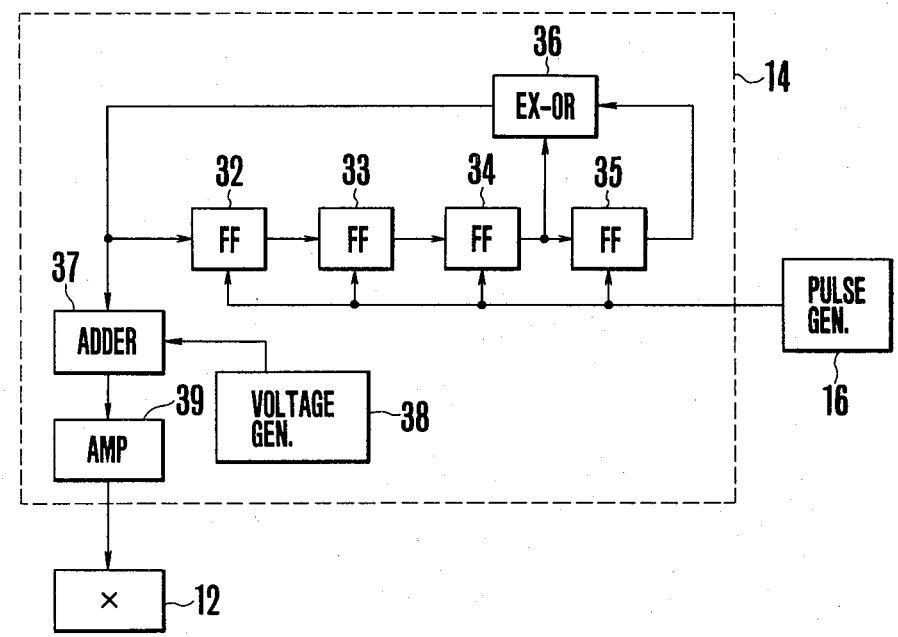

FIG. 6 shows an example of the symbol sequence generator 14 in case when the period is 15. Flip-flops 32, 33, 34 and 35 are set to an initial state of 1 and are driven by the clock generated from the clock generator 16 (FIG. 2) mentioned before. The outputs of the flip-flops 34 and 35 are coupled to an exclusive OR gate 36, and the exclusive OR output therefrom is fed back to the flip-flop 32 while it is also fed to an adder 37, to which a reference voltage generated from a reference voltage generator 38 is also supplied. The output of the adder is multiplied by a constant in an amplifier 39. The output of the amplifier 39 corresponds to $\alpha$ and $\beta$ in the equation (7).

While the foregoing description of one embodiment of the invention has concerned with only the receiving side, on the transmitting side the same test signal is produced using the identical symbol sequence generator to that shown in FIG. 2.

That is, a test signal suited to the transmission line is generated according to the output signal of an amplifier 39 provided on the transmitting side.

What is claimed is:

1. A fast start-up system for a transversal equalizer comprising:
    means provided in a transmitter for generating a periodic symbol sequence with a period L, the auto correlation function of said sequence being completely O except for its center;
    means for generating and transmitting a test signal based upon said generated symbol sequence;
    means provided in a receiver for generating the same periodic symbol sequence as that generated in the transmitter in a proper phase relation thereto according to a received signal;
    means for calculating the correlation between L sampled values obtained by sampling the received test signal at the symbol interval and a sequence obtained by recirculating said periodic symbol sequence for each of consecutive M shifted phases;
    means for calculating the correlation between L sampled values obtained by sampling the received test signal at the symbol inerval with a phase diferring from the phase of said first-mentioned sampled values by an amount corresponding to one half of the symbol interval and a sequence obtained by recirculating said periodic symbol sequence for each of M' consecutive shifted phases;
    means for multiplying said calculated M+M' correlation values by a constant;
    means for obtaining discrete Fourier transform of the M+M' multiplied correlation values at N points equal to or greater than M+M' in number;
    means for storing values of a predetermined frequency characteristic for frequency points obtained as the discrete Fourier transform;
    means for dividing the stored values by said respective values obtained by the discrete Fourier transform;
    means for obtaining inverse discrete Fourier transform of the N divided values; and
    means for initializing, with the numerical values obtained as the inverse discrete Fourier transform, the tap gain of a transversal automatic equalizer with the basic delay interval equal to one half the symbol interval;
    thereby permitting a sufficiently equalized state to be realized fast with a short test sequence.

2. The fast start-up system according to claim 1, which further comprises phase compensation means including:
    means for obtaining L sequential sampled values by sampling said test signal at the symbol rate;
    means for generating a complex conjugate sequence in a complex conjugate relation to the symbol sequence constituting said test signal;
    means for receiving said sequence of L sampled values and said complex conjugate sequence and calculating the product sum for said period;
    means for deriving a phase representing said phase variation from the result of the product sum calculation; and
    means for effecting phase compensation by causing the rotation of the sampled values of said test signal by the derived phase in the reverse direction.

* * * * *